United States Patent [19]
Gapinski et al.

[11] Patent Number: 6,035,743
[45] Date of Patent: Mar. 14, 2000

[54] MULTI-FUNCTIONAL CLIPLESS PEDAL

[75] Inventors: Albert G. Gapinski; Patrick Warner, both of Boulder, Colo.

[73] Assignee: Schwinn Cycling & Fitness Inc., Boulder, Colo.

[21] Appl. No.: 09/040,551

[22] Filed: Mar. 18, 1998

[51] Int. Cl.[7] ...................................................... G05G 1/14
[52] U.S. Cl. .......................... 74/594.6; 74/594.4; 36/131; D12/125
[58] Field of Search .............................. 74/594.4, 594.6; 36/130, 131; D12/125

[56] References Cited

U.S. PATENT DOCUMENTS

| D. 191,156 | 8/1961 | Back | D12/125 |
|---|---|---|---|
| D. 262,873 | 2/1982 | Okajima | D12/125 |
| D. 286,993 | 12/1986 | Kotamaki | D12/125 |
| D. 324,838 | 3/1992 | Briscadieu | D12/125 |
| 5,195,397 | 3/1993 | Nagano | 74/594.4 |
| 5,381,708 | 1/1995 | Liao | 74/594.6 |
| 5,546,829 | 8/1996 | Bryne | 74/594.6 |
| 5,685,202 | 11/1997 | Chen | 74/594.6 |
| 5,692,415 | 12/1997 | Lin | 74/594.6 |
| 5,784,931 | 7/1998 | Ueda | 74/594.6 |
| 5,787,764 | 8/1998 | Peyre | 74/594.6 |
| 5,806,379 | 9/1998 | Nagano | 74/594.6 |

FOREIGN PATENT DOCUMENTS

| 0 753 454 A1 | 7/1996 | European Pat. Off. | 74/594.6 |
|---|---|---|---|
| PCT/US88/ 00179 | 3/1989 | WIPO | 74/594.6 |

OTHER PUBLICATIONS

Mesa Sports Inc.; EXUS™ Cycle Products catalog; Aug., 1997.

*Primary Examiner*—Vinh T. Luong
*Attorney, Agent, or Firm*—Holland & Hart LLP

[57] ABSTRACT

A pedal including a main body having a first side and a second side, the first side of the main body defining a first clipless retaining structure, and the second side of the main body defining a second clipless retaining structure. The first clipless retaining structure is a road bike clipless retaining structure and the second clipless retaining structure is a mountain bike clipless retaining structure. The pedal can include a cleat adapter for installation into the first clipless retaining structure wherein the cleat adapter includes a lock mechanism to fix the cleat adapter in the first clipless retaining structure. The lock mechanism has a locked position to fix the cleat adapter in the first clipless retaining structure, and an unlocked position to allow the cleat adapter to release from the first clipless retaining structure.

9 Claims, 7 Drawing Sheets

MULTI-FUNCTIONAL CLIPLESS PEDAL

FIELD OF THE INVENTION

This invention relates to pedals for use on a pedal-driven apparatus, and more particularly to a multi-functional pedal having different clipless structures on either side, and that can receive a cleat adapter including a toe clip.

BACKGROUND OF THE INVENTION

The use of clipless pedals has become popular with both road and mountain bike enthusiasts. There are two general types of clipless pedals, one for road bicycles and one for mountain bicycles. The difference is a result of the fact that mountain bicycle enthusiasts often have to walk and pull or carry their bicycles many times during a ride. Walking is difficult where traditional road style clipless pedals are used since the corresponding cleat that is secured in the clipless pedal extends from the sole of the cycle shoe. Mountain bike clipless pedals are designed to work with cleats that are recessed or flush with the sole of the cycle shoe, so walking is not seriously impeded, if impeded at all.

Clipless pedals allow the user to use energy more efficiently because the user's feet are fairly rigidly attached to the pedals. This allows the user to pull upwardly in the up stroke, as well as apply more force in the top-dead-center and bottom-dead-center pedal positions.

One drawback of clipless pedals is that usually only one type of clipless pedal is used on a bicycle at a time. If a user wishes to switch between a road style clipless pedal and a mountain bike style of clipless pedal, the road style pedals must be removed and the mountain bike style pedals installed.

Recently, combination pedals have been introduced that include a clipless pedal structure on one side and a standard pedal on the other. This allows the user to use one type of clipless structure with its attendant efficiencies on one side of the pedal, but then only use a standard pedal, with no special efficiencies, with the other side of the pedal.

There is lacking in the art a single pedal structure that allows one to use road style clipless pedal structure, mountain bike style clipless pedal structure, or a toe clip structure. This type of pedal would be particularly useful in an application on an exercise bicycle where users could thus choose the pedal style they are most comfortable with for their exercise session.

It is with the shortcomings of the prior art in mind that the modular load bearing field support system of the present invention has been developed.

SUMMARY OF THE INVENTION

The instant invention addresses a single pedal including both road style clipless and mountain bike style clipless capabilities, as well as toe clip capabilities when a cleat adapter is utilized.

The instant invention contemplates a pedal including a main body having a first side and a second side, the first side of the main body defining a first clipless retaining structure, and the second side of the main body defining a second clipless retaining structure.

The instant invention also contemplates a pedal including a main body having a first side and a second side, the first side of the main body defining a first clipless retaining structure, and the second side of the main body defining a second clipless retaining structure. The first clipless retaining structure is a road bike clipless retaining structure and the second clipless retaining structure is a mountain bike clipless retaining structure.

The instant invention also contemplates a pedal as above with a cleat adapter for installation into the first clipless retaining structure wherein the cleat adapter includes a lock mechanism to fix the cleat adapter in the first clipless retaining structure. The lock mechanism has a locked position to fix the cleat adapter in the first clipless retaining structure, and an unlocked position to allow the cleat adapter to release from the first clipless retaining structure.

The instant invention also contemplates a pedal including a main body having a first side, the first side of the main body defining a first clipless retaining structure, a cleat adapter having a base member, the base member receivable in the first clipless retaining structure, and means for locking the cleat adapter to the base member.

The instant invention also contemplates a pedal including a main body having a first side, the first side of the main body defining a first clipless retaining structure, a cleat adapter having a base member, the base member receivable in the first clipless retaining structure, and a locking mechanism to lock the cleat adapter to the base member. The locking mechanism can include a pin extending from the base member and a recess formed on the main body for receiving the pin. In addition, a member can be attached on the top surface of the base member and be movable between a locked and unlocked position, with the pin attached to the pivot member and extending from the base member when in the locked position and retracting into the base member in the unlocked position.

A more complete appreciation of the present invention and its scope can be obtained from understanding the accompanying drawings, which are briefly summarized below, the following detailed description of the presently preferred embodiments of the invention, and the appended claims.

DETAILED DESCRIPTION OF THE PREFERRED EMBODIMENT

Figure 1:
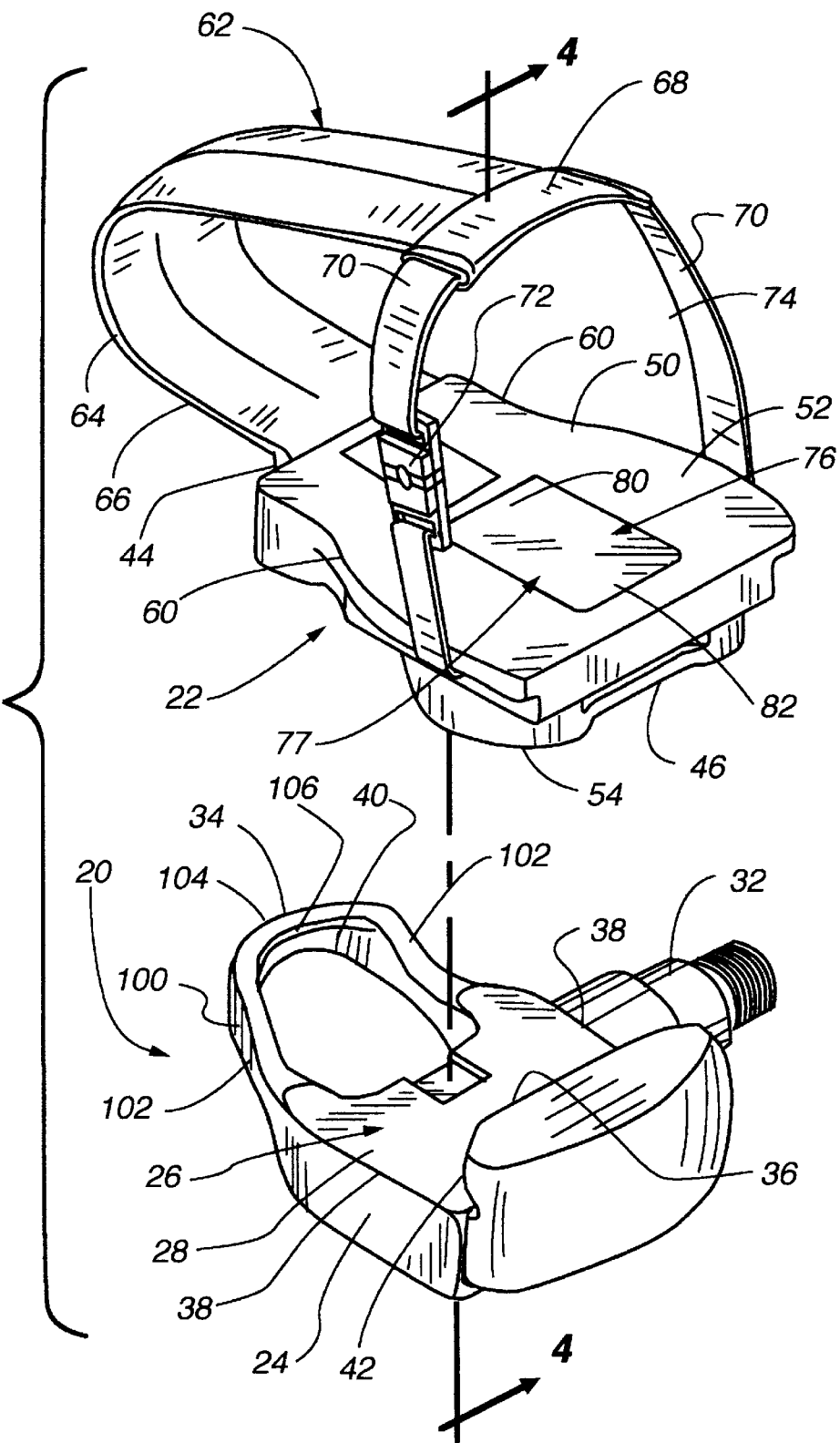
FIG. 1 is a perspective view of the pedal of the present invention, showing the road style of the clipless pedal and the adapter cleat having a toe clip formed thereon.

A two-sided pedal 20 and associated adapter cleat 22 of the present invention, prior to the attachment of the cleat to the pedal, are shown in FIG. 1. The two-sided pedal 20 has a main body 24 having road style clipless retaining structure 26 on a first side 28, and a mountain bike style clipless retaining structure 30 (FIG. 6) on a second side 31. The main body 24 is rotatably mounted on an axle shaft 32 to allow the main body to rotate around the axle shaft as is conventionally known. The axle shaft is attached to an end of a crank-arm (not shown) on a drive train of a pedal-driven apparatus, such as a bicycle or exercise apparatus.

The road style clipless pedal 26 on the first side 28 of the main body 24 includes opposing front 34 and rear 36 edges, and opposing side edges 38. The front 34 and rear 36 edges each form receptors 40 and 42 for corresponding front 44 and rear 46 edges of the adapter cleat 22, as described below. A recess 48 is formed on the first side 28 of the main body 24 between the front 34 and rear 36 edges, and forms part of the locking mechanism structure, as further described below.

The second side 31 of the main body 24 defines a mountain bike style clipless structure 30 (see FIGS. 3, 4, 6, and 8), such as that set forth in U.S. Pat. No. 5,692,415, issued Dec. 2, 1997 to Lin, entitled "Bicycle Pedal Having Two Surfaces For Coupling To A Bicycle Shoe", hereby incorporated by reference in its entirety.

The adapter cleat 22 includes a base 50 member having top 52 and bottom 54 opposing sides, and front 44, rear 46 and opposing side edges 60. A toe clip 62 is attached to the adapter cleat 22 at the front 44 and opposing side edges 60, and extends over the top side 52 of the base member 50. The toe clip 62 includes a front portion 64, typically made of plastic, that attaches at one end 66 to the front edge 44 of the cleat 22, and extends forwardly, upwardly and rearwardly therefrom to terminate in a second end 68 extending over the top side of the base member 50. Flexible side portions 70 extend from the second end 68 of the front portion 64 to each of the side edges 60 of the base member 50. The flexible side portions 70 are adjustable in length, such as by use of the buckle 72, to adjust the size of the opening 74 of the toe clip 62 defined by the side portions 70 and the second end 68 of the front portion 64. The toe clip 62 holds the adapter cleat 22 on a person's foot relatively tightly, but allows the foot to be inserted and removed through the opening 74.

The front edge 44 of the adapter cleat 22 is formed to be received in the front receptor 40 of the road style clipless structure 26. The rear edge 58 of the adapter cleat 22 is formed to be received in the rear receptor 42 of the road style clipless structure 26. A pivoting member 76, forming part of the locking mechanism structure 77, is positioned on the base member 50 between the front 44 and rear 46 edges thereof. The pivoting mechanism 76 moves between an unlocked position (shown in dash in FIG. 3 and solid in FIG. 4) and a locked position (shown in dash in FIG. 3 and solid in FIG. 4). When in the locked position, the pivot mechanism 76 is flush with the top side 52 of the base member 50, and a pin 78 extends from the bottom surface 54 of the base member 50 (see FIGS. 3 and 4). When in the unlocked position, the front end 80 of the pivot mechanism 76 is above the top side of the base member 50 and the pin 78 does not extend from the bottom side 54 of the base member (see FIGS. 3 and 4), and the rear end 82 of the pivot mechanism 76 is below the top side of the base member 50.

Figure 2:
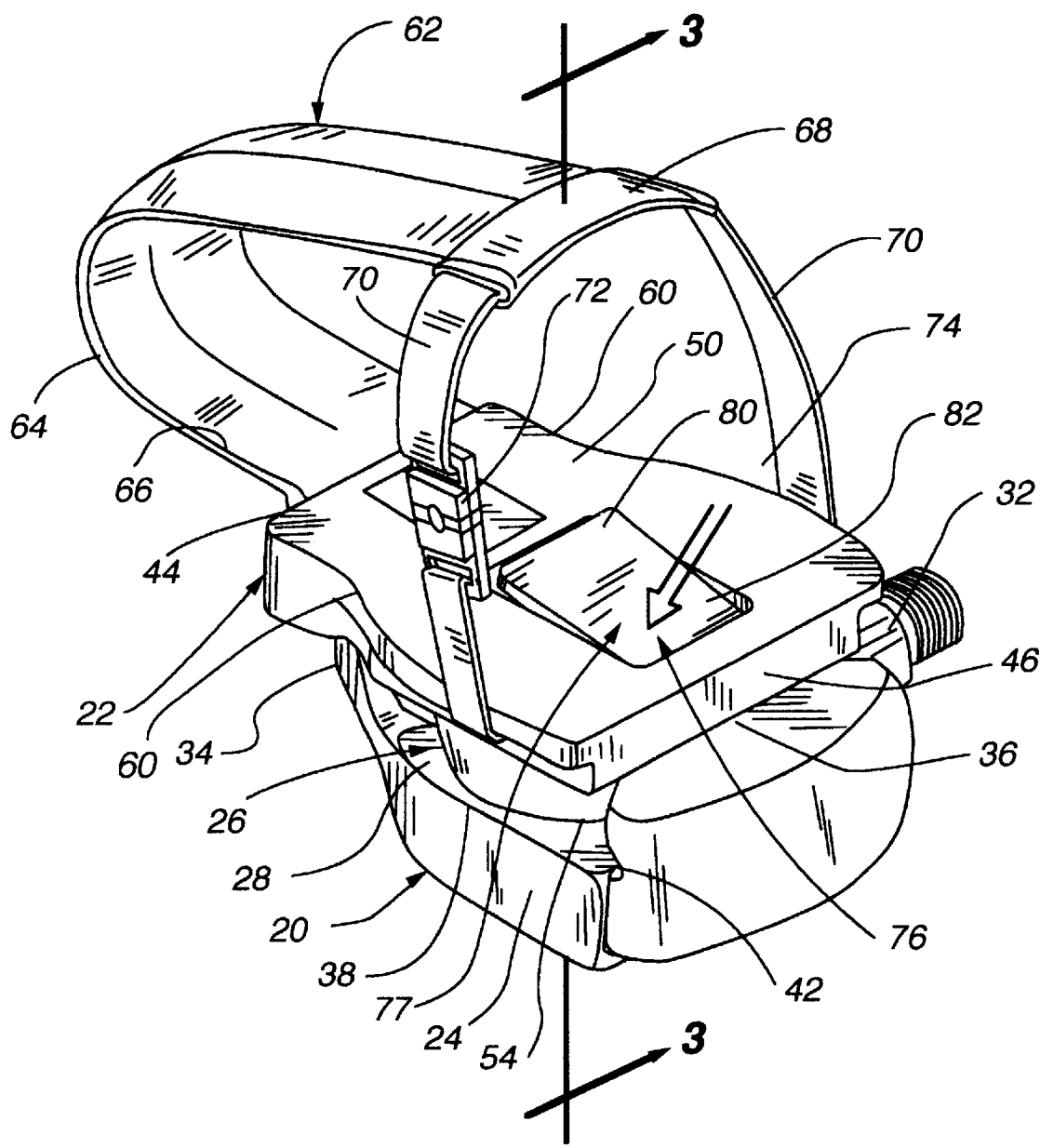
FIG. 2 is a perspective view of the pedal of the present invention, showing the adapter cleat inserted into the road style clipless structure of the pedal of FIG. 1.

The adapter cleat 22 is shown inserted into the road style clipless structure 26 of the pedal 20 in FIG. 2. The front edge 44 of the base member 50 of the cleat adapter 22 is received in the front receptor 40 of the pedal 20, and the rear edge 46 of the base member 50 of the cleat adapter 22 is received in the rear receptor 42 of the pedal 20. The bottom side 54 of the base member 50 of the cleat adapter 22 is adjacent to and preferably touching the top side 28 of the main body 24 of the pedal. The pivot mechanism 76 can move between the locked and unlocked position when the cleat adapter 22 is attached to the pedal 20. When in the locked position, the pin 78 extends into the pin recess 48 on the top surface of the pedal 20. When in the unlocked position, the pin 78 is retracted from the pin recess 48. The pivot mechanism 76 is preferably biased to the locked position, and can be moved to the unlocked position by pressing the rear end 82 of the pivot member 76 downwardly to force the front end 80 upwardly, which retracts the pin 78 from the pin recess 48. The function and structure of the lock mechanism 76 is described in more detail below.

The instant invention is created to allow a user to attach to a pedal 20 regardless if a road style clipless structure is required, or a mountain bike style clipless structure is required, or if a toe cage is required. The pedal 20 has one side with a road style clipless structure formed thereon, one side with a mountain bike style clipless structure formed thereon, and a cleat adapter which can be used with either the road style or mountain bike style clipless structure to allow the attachment of a toe clip. When used on a bicycle or other pedal-actuated apparatus such as an exercise bicycle or other type of exercise equipment, it is desirable that the cleats be removable from the clipless structures. However, it is desired that the cleat adapter 22 not be releasable, when the user's foot is in place in the toe clip 62, from the clipless structure since the user can simply remove his or her foot from the toe clip 62 in a conventional manner. Thus, the locking mechanism 77 is included on the cleat adapter 22 to keep the cleat adapter from twisting with respect to the clipless structure on the pedal 20 to effect a release of the cleat adapter, as is described in greater detail below.

The cleat adapter 22 with locking mechanism 77 is described herein preferably as used with a road style clipless structure 26 as an example. The road style clipless structure 26, as best shown in FIGS. 3, 4, 5, and 8 normally operates to securely receive a cleat attached to a cyclist's shoe. Typically the cleat for use with a road style clipless structure secures to and extends outwardly from the sole of the cyclist's shoe. The bottom of the cleat adapter 22 has the same structure as a standard cleat alone, one of which is described herein. The front edge 44 and a rear edge 46, each form a rib 84 and 86, respectively, for receipt in the front receptor 40 and rear receptor 42 of the main body 24 of the pedal 20, respectively. The road style clipless structure 26 retains the cleat adapter as the cyclist pedals, generally applying upwardly-directed force on the front receptor 40 and the rear receptor 42 structure. In this way the cyclist can utilize the up stroke of the pedal movement (by pulling upwardly on the pedal, since the cleat is retained in the clipless structure), not just the down stroke of the pedal movement. Ideally, the cleat adapter 22 is able to move slightly in the lateral plane (of the top surface of the main body of the pedal) when the cleat adapter is retained in the road style clipless structure 26 to alleviate orientation issues which can affect the cyclist's knees.

The cleat adapter 22 can be removed from the road style clipless structure 26 typically by twisting the rear edge 46 of the cleat outwardly (away from the crank arm to which the pedal is attached) in the lateral plane (of the top surface of the main body of the pedal) with respect to the pedal 20. Normally, the rear receptor 42 on the main body of the pedal 20 is pivotally attached to the main body, and is spring-loaded to be biased in a retaining or clamping position. Twisting the cleat adapter 22 so that the rear edge is preferably moved outwardly works against the spring loaded rear receptor 42 and overcomes the spring-loaded bias to release the rear edge 46 of the cleat adapter 22. Typically, when the cleat adapter 22 is twisted it is pivoted about the engagement point of the front edge 44 of the cleat adapter 22 with the front receptor 42 of the pedal. Under this system, for a left pedal attached to a left crank arm the cleat adapter can be twisted clockwise to effect release. For a right pedal attached to a right crank arm, the cleat adapter 22 can be twisted counter-clockwise to effect release. This type of release system is well known or available in the art. Twisting the cleat either inwardly or outwardly will cause the release of the cleat adapter from the clipless structure 26. This type of release system reduces the chance that the cleat adapter 22 will unintentionally release during use (movement of the crank arm) when the forces applied by the cleat adapter to the pedal are mainly in the upward and downward, not twisting, direction.

A suitable road style clipless structure 26 described above includes but is not limited to the Exus model E-1 or E-7, as shown in the Exus Cycle Products Catalog, Printed August 1997, copyright 1997, and available from Exus Enterprise Company Ltd., 816 Chang Sheng Road, Waipu 438, Taichung County, Taiwan, R.O.C., which is a division of V.P. Components Company Ltd., of the same address. Suitable cleats for use with the road style clipless structure 26 includes but is not limited to the E-BLK1 and E-ARC1, also by Exus, and also shown in the Exus Cycle Products Catalog, Printed August 1997.

Figure 3:
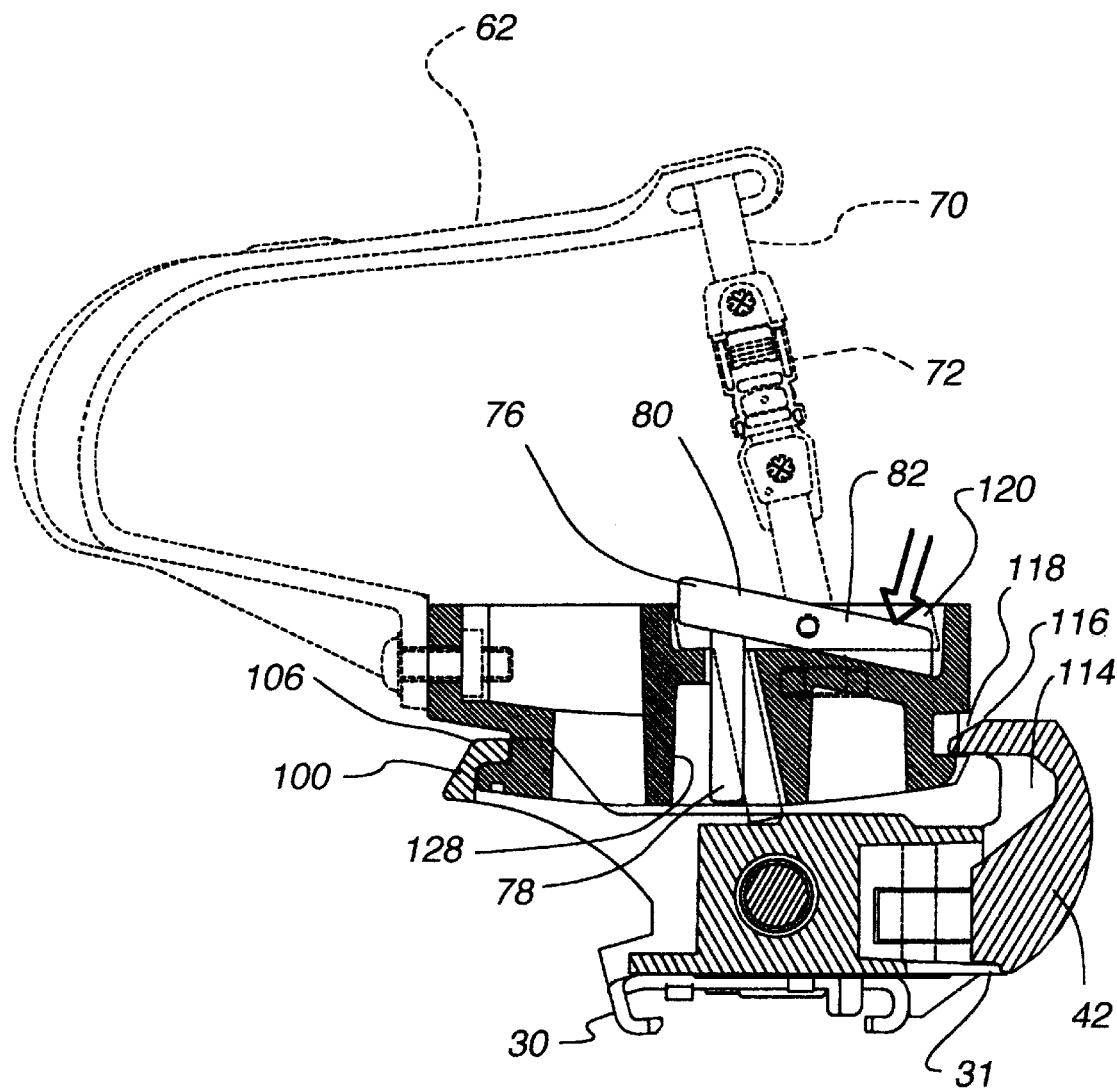
FIG. 3 is a section taken along line 3—3 of FIG. 2, showing the twist-restraint locking mechanism of the present invention formed in the adapter cleat.
Figure 4:
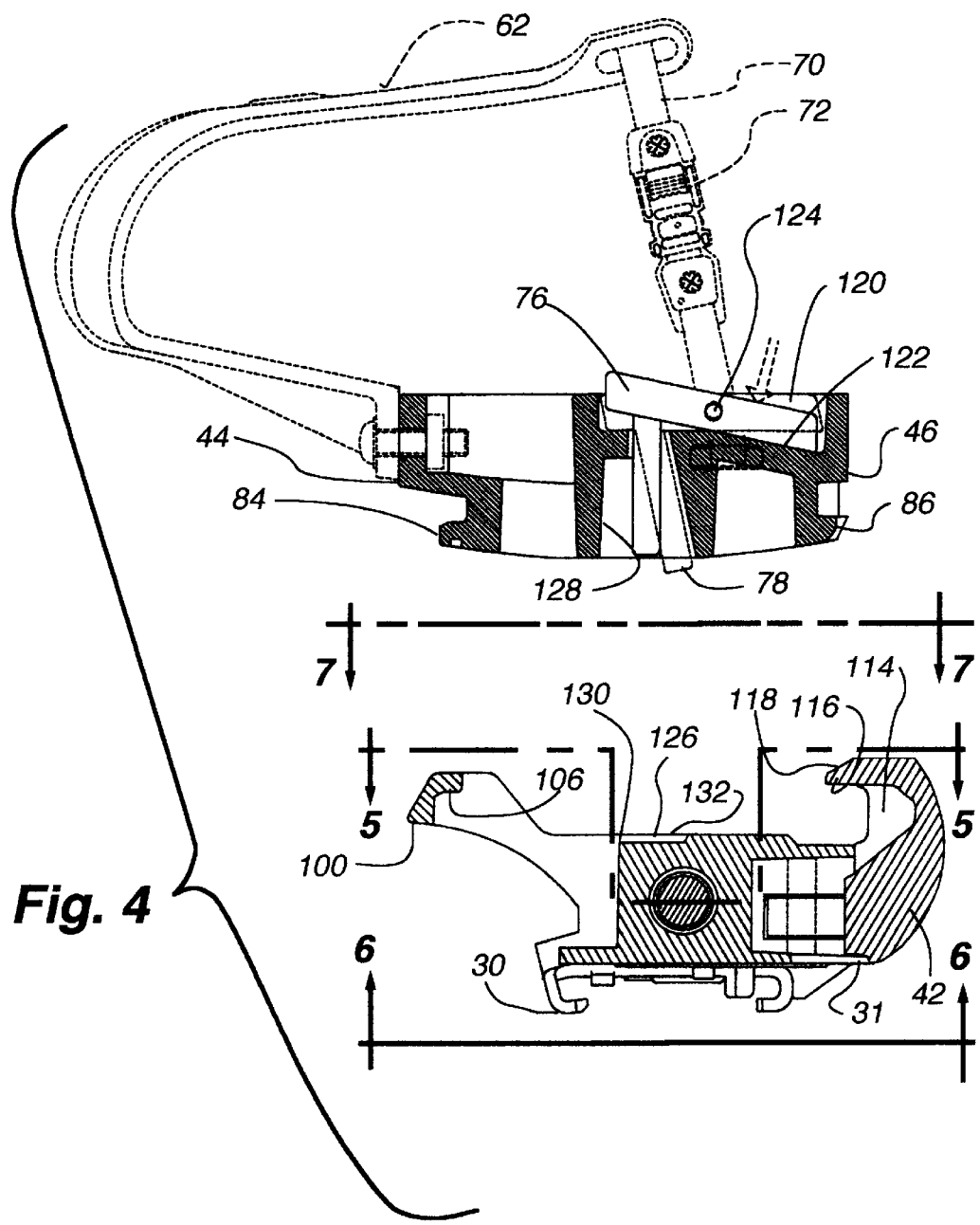
FIG. 4 is a section taken along line 4—4 of FIG. 1, showing the adapter cleat of the present invention prior to insertion into the road style clipless structure of the pedal.

The front 40 and rear 42 receptors of the road style clipless structure 26 are shown in FIGS. 1, 3 and 4. The front receptor 40 is a rigid loop 100 extending forwardly from the main body, having opposing sides 102 and a front portion 104 between the two sides. The front portion 104 forms a rearwardly extending overhanging flange 106. The rib or tab 84 of the front edge 44 of the cleat adapter 22 fits into the front receptor 40 between the opposing sides 102, and extends under the flange 106. The flange 106 engages the rib 84 of the front edge 44 of the cleat adapter 22 and keeps the cleat adapter 22 from moving freely upwardly with respect to the pedal. The side walls 102 keep the front edge 44 of the cleat adapter 22 adequately centered and positioned underneath the flange 106 to insure that the front edge 44 of the cleat adapter 22 does not disengage from the flange 106 by moving laterally.

Figure 5:
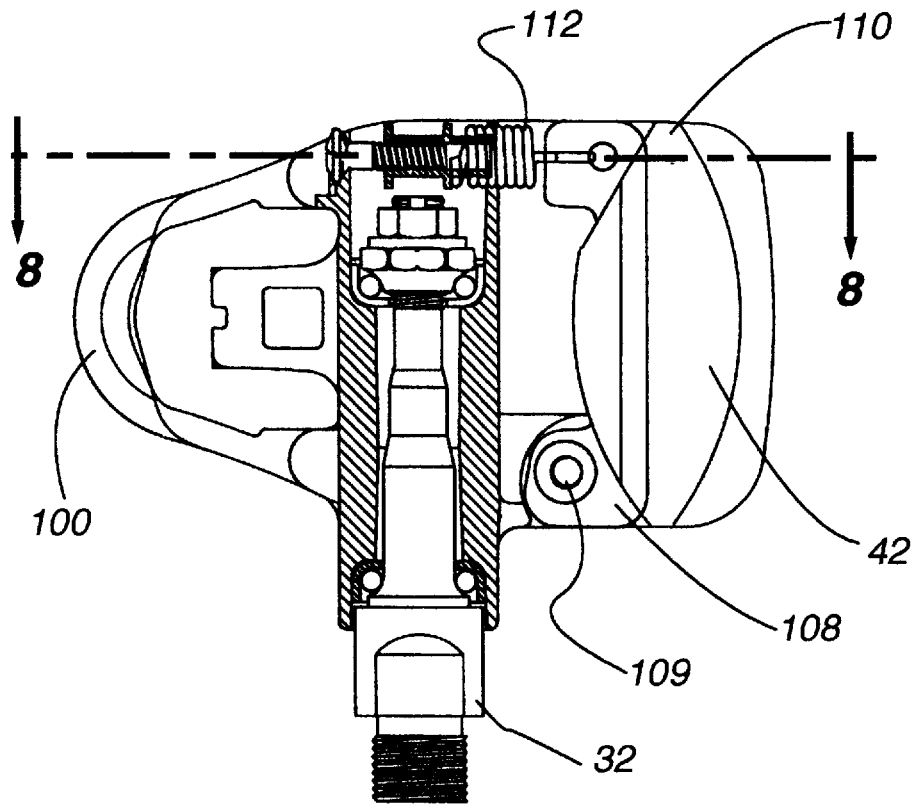
FIG. 5 is a multi-level section taken along line 5—5 of FIG. 4, showing the axle structure and resilient spring structure of the road side clipless pedal.
Figure 8:
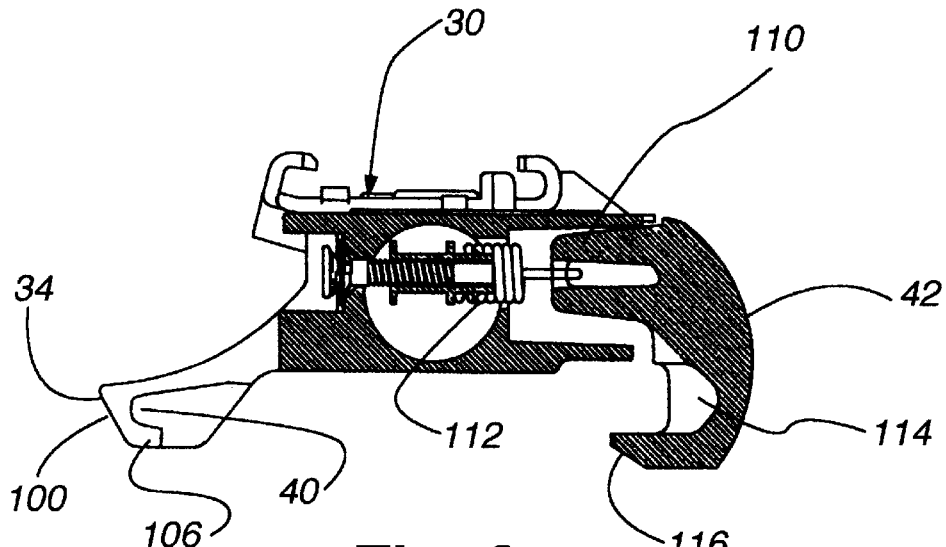
FIG. 8 is a section taken along line 8—8 of FIG. 5.
Figure 7:
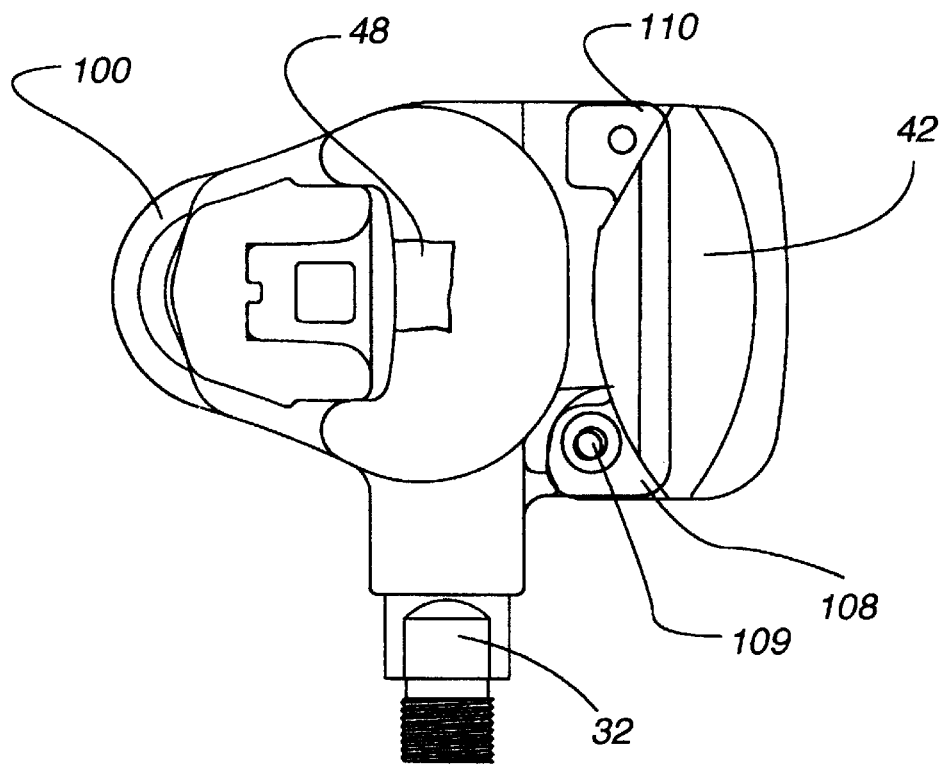
FIG. 7 is a plan view of the road style clipless structure on one side of the pedal.

One end 108 of the rear receptor 42 is pivotally attached at a pivot point 109 to the inside rear corner of the main body of the pedal 20. The opposing end 110 of the rear receptor 42 is biased in a retaining or clamped position against the main body by a strong spring 112, as shown in FIGS. 5 and 8. The spring 112 is anchored to the main body at one end and to the rear receptor 42 at the other end. The rear receptor 42 defines a recess 114 along its length bounded on the top by an overhanging, forwardly extending flange 116. The rib 86 on the rear edge 46 of the cleat adapter 22 fits under and engages the rear flange 116 of the pedal. The rear flange 116 keeps the rear edge 46 of the cleat adapter 22 from moving upwardly with respect to the pedal 20.

To insert the cleat adapter 22 into the road style clipless structure 26, the front edge 44 of the cleat adapter 22 is positioned under the flange 106 of the front receptor 40. The rear edge 46 of the cleat adapter is then forced against the rear receptor 42 in a downwardly direction. An angled surface 118 on the rear receptor 42 directs the downward force of the cleat adapter 22 in a rearward direction to pivot the rear receptor 42 against the spring 112 about the rear inside corner of the pedal. The rear edge 46 of the cleat adapter 22 then moves downwardly a sufficient distance to insert into the recess 114 formed in the rear receptor 42, allowing the spring 112 to bias the rear receptor 42 back to the clamping position against the pedal 20 (FIG. 3), and cause the rib 86 of the rear edge 46 of the cleat adapter 22 to engage the forwardly extending rear flange 116. The cleat adapter 22 is thus held in position on the pedal 20 in the road style clipless structure 26. The cleat adapter 22 is removable from the road style clipless structure 26 when the rear edge 46 of the cleat adapter 22 is twisted outwardly to cause the rear receptor 42 to pivot against the force of the spring 112 and allow the rear rib 86 to disengage from the rear flange 116 of the rear receptor 42.

As noted above, the cleat adapter 22 is desired to be fixed, when the user's foot is positioned in the top clip 62, in the clipless pedal 20 since the cleat adapter 22 includes a toe clip 62, which allows the user to remove their feet from the pedal at any time by removing their foot from the toe clip. A locking mechanism 77 has been included in the cleat adapter 22 for insertion into the pin recess 48 formed in the main body of the pedal 20 to keep the cleat adapter 22 from being twisted in the clipless pedal when the locking mechanism 77 is engaged (see FIG. 3). The locking mechanism 77 includes a member, such as the pivot member 76 positioned in a recess 120 formed in the top surface of the cleat adapter 22, and a pin 78 extending downwardly from the front portion 80 of the pivot member 76. As noted above, the pin 78 extends from the lower surface of the cleat adapter 22 when the pivot member 76 is in the locked position, and retracts to be flush with or above the bottom surface of the cleat adapter 22 when the pivot member 76 is in the unlocked position. The cleat adapter 22 is positioned in the clipless structure as described above, with the final step of moving the pivot member 76 to the flush position, which inserts the pin 78 into the pin recess 48, as described below. The cleat adapter 22 is removed from the clipless structure by moving the pivot member 76 to the unlocked position to retract the pin 78 from the pin recess 48, and twisting the cleat adapter 22 to disengage it from the clipless structure 26.

The locking mechanism 77 of the cleat adapter 22 is described below in more detail with respect to FIGS. 3, 4, 9, 10 and 11. The pivot member 76 is positioned in a recess 120 having an angular floor 122 in the top surface of the cleat adapter. A pin 124 extends from the sidewalls 126 of the recess 120 and through the pivot member 76 to pivotally attach the pivot member thereto. The floor 122 of the recess below the front portion 80 of the pivot member is substantially parallel to the top surface of the cleat adapter 22 such that when the pivot member 76 is in the locked position, the pivot member 76 is flush with the top surface of the cleat adapter 22. The floor of the recess 122 below the rear portion 82 of the pivot member 76 angles downwardly to allow the rear portion 82 to be pivoted into the cleat adapter 22, which causes the front portion 80 to be pivoted upwardly, which retracts the pin 78 into the cleat adapter 22 (the unlocked position). The pivot member 76 is moved to the unlocked position by pushing the rear portion 82 of the pivot member 76 downwardly into the recess 120. The pivot member 76 is preferably biased, by gravity or otherwise (such as by a spring), into the locked position to keep the pin 78 in the pin recess 48, thus not allowing the cleat adapter 22 to accidentally release, and to keep the front portion 80 of the pivot member 76 from interfering with the sole of the user's shoe.

As shown in FIGS. 3 and 4, the pin 78 is fixed to and extends downwardly from the front portion 80 of the pivot member 76, preferably at an acute angle to the length of the pivot member. The pin 78 is positioned through an aperture 128 formed in the cleat adapter 22 from the floor of the recess 120 through the bottom surface of the cleat adapter 22. The angle of attachment of the pin 78 to the pivot member 76 is such that when in the unlocked position, the pin 78 extends substantially at 90 degrees to the cleat adapter 22, and when in the locked position, the pin 78 extends at an acute angle downwardly and rearwardly of the cleat adapter 22. The pin 78 extends from the bottom surface of the cleat adapter 22 to approximately 5 mm. It can extend more for certain designs, but 5 mm has been found to be sufficient to resist the twist of the cleat adapter in the clipless pedal. The cross section of the pin 78 is preferably square or rectangular, but can be triangular, oval, or circular as desired. The pin recess 48 should be formed to substantially resemble the cross sectional shape of the pin 78.

The pin recess 48 is formed in the top surface of the pedal 20 for receiving the pin 78 when the pivot member 76 is in the locked position. The pin recess 48 is dimensioned so as to closely fit the pin 78 in the lateral dimension (extending between the opposing sides 38 of the pedal). This close fit allows the pin 78 to engage the sidewalls 126 of the pin recess 48 in the pedal quickly upon any twisting of the cleat adapter 22 by the user. The front 130 and rear 132 sidewalls of the pin recess 48 in the pedal can be loosely dimensioned to allow the pin 78 to move through a slight vertical arc during insertion into and extraction from the pin recess 48. The fit of the pin 78 in the pin recess 48 (locked position) causes the pin 78 to engage the sidewalls 126 of the pin recess 48 to keep the cleat adapter 22 from twisting with respect to the pedal 20, and thus locks the cleat adapter 22 into the clipless structure.

The cleat adapter 22 is removed from the clipless structure 26 by moving the pivot member 76 into the unlocked position to extract the pin 78 from the pin recess 48, which allows the cleat adapter 22 to twist with respect to the pedal and be release from the clipless structure 26, as described above. Typically, as noted above, the cleat adapter 22 is twisted about the point of engagement of the front edge 44 of the cleat adapter 22 and the front receptor 40, which would cause the pin 78 to attempt to move through a horizontal arc.

In clipless structure designs where the cleat adapter 22 is twisted about its center or about the position of the pin 78 in the locked position, the pin 78 should not have a circular cross section because it would not restrict the twisting motion of the cleat adapter 22 since the pin 78 would rotate about its own longitudinal axis. Instead, the pin 78 should be square or rectangular, and the pin recess 48 similarly shaped to resist the twisting motion. The rear wall 132 of the pin recess may be as closely dimensioned to the pin 78 as the sidewalls 126 are to create further physical engagement surfaces to inhibit the twisting motion.

Figure 9:
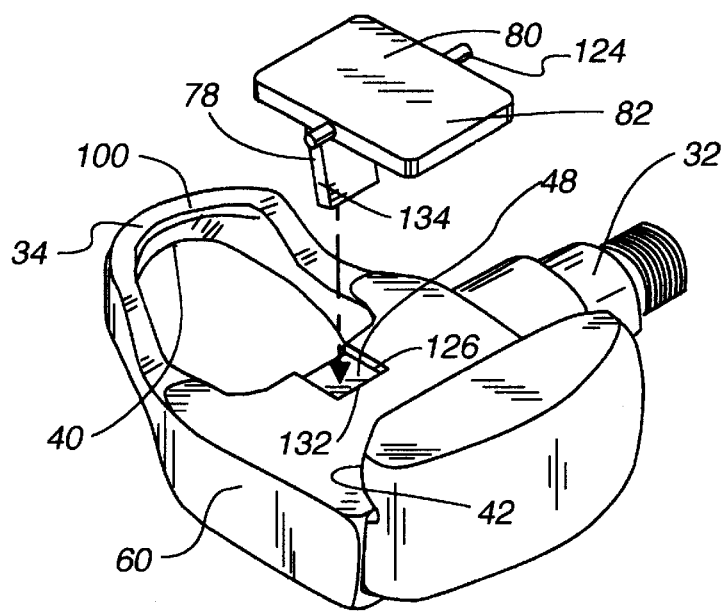
FIG. 9 is an exploded schematic view of the pivot member of the locking mechanism prior to insertion of the pin into the pin recess.
Figure 10:
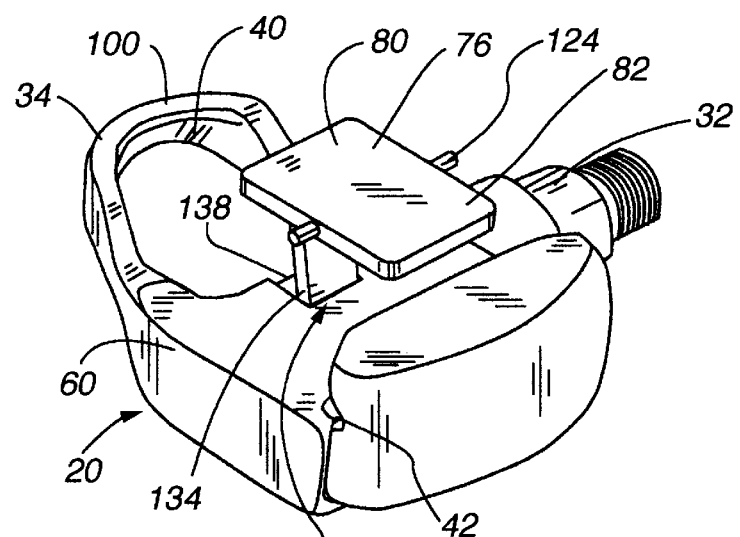
FIG. 10 is a schematic view of the pivot member of the locking mechanism with the pin inserted in the pin recess.
Figure 11:
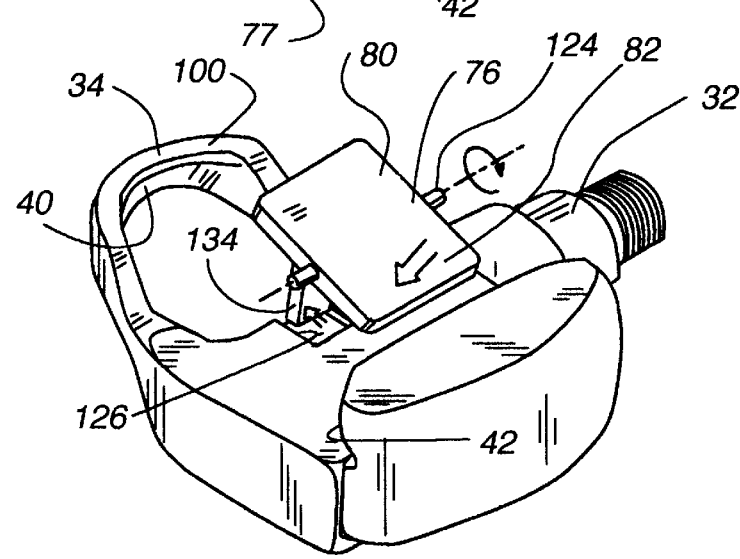
FIG. 11 is a schematic view of the pivot member of the locking mechanism with the pivot member pivoted about the pivot point to retract the pin from the pin recess.

Referring to FIGS. 9, 10 and 11, the interaction of the pin 78 of the pivot member 76 and the pin recess 48 on the main body of the pedal is shown. FIG. 9 shows the orientation of the pivot member 76, and depending pin 78, with respect to the pin recess 48 on the road style clipless structure 26. FIG. 10 shows the pivot member 76 in the locked position and the pin 78 inserted into the pin recess 48 (analogous to FIG. 3). The sides 134 of the pin 78 engage the sidewalls 126 of the pin recess 48 to resist any lateral or twisting movement of the pin 78 (from the cleat adapter). FIG. 11 shows the pivot member 76 moved to the unlocked position, with the rear portion 82 of the pivot member 76 moved downwardly in a rotation around the pivot pin 78. This downward movement of the rear portion 82 of the pivot member 76 retracts the pin 78 from the pin recess 48 to allow the cleat adapter 22 to twist and be removed from the road style clipless structure 26 of the pedal.

Figure 6:
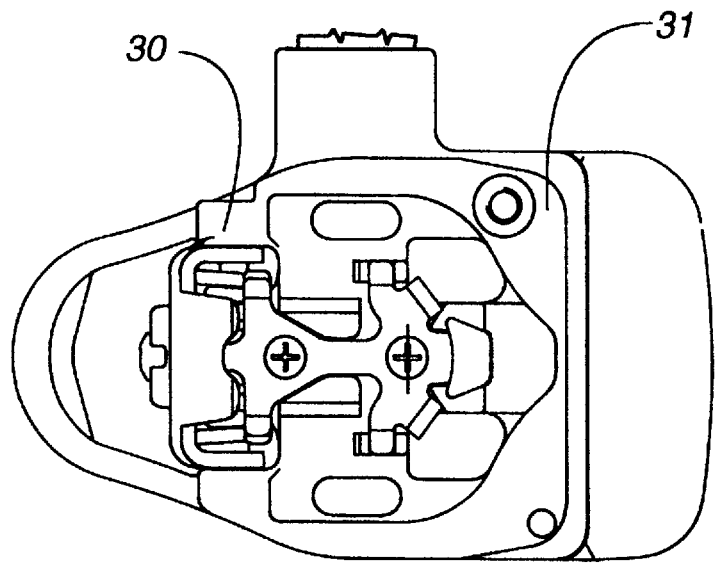
FIG. 6 is a plan view of the mountain bike style clipless structure on a side of the pedal.

While the cleat adapter 22 with locking mechanism 77 has been described as being built into the road style clipless structure 26, it is contemplated that it could be built into the mountain bike style clipless structure 30 (commonly known as SPD) noted above with required structural variations. A mountain bike style clipless structure is shown in FIG. 6, which is similar to that disclosed in U.S. Pat. No. 5,692,415, which was incorporated herein by reference above. The cleat is removable from the clipless structure again by a twisting motion. The locking mechanism 77 of a cleat adapter 22 for use on this structure would inhibit the twisting motion, and thus keep the cleat adapter 22 retained in the clipless structure 26.

The multi-function pedal 20 and the cleat adapter 22 with locking mechanism 77 described herein allow one pedal type to be used on a bicycle or other pedal-actuated apparatus. The one multi-function pedal would allow the user to choose between use of cycling shoes with road style cleats, mountain bike style cleats, or normal shoes using the cleat adapter 22 on the pedal 20. This multi-use feature is especially valuable to pedal driven apparatus used by a variety of people, such as an exercise bicycle at an exercise facility.

If the cleat adapter 22 is used, the cleat adapter 22 is locked onto the clipless pedal 20 by the locking mechanism 77 which keeps the cleat adapter 22 from disconnecting from the pedal 20. This is important because when toe clips 62 are used, the forces applied to the pedal by the user are not as uniformly up and down as when the user is attached to the pedals by a clipless structure. Thus, there is a chance that without the locking mechanism the toe clip 62 could allow the user to twist the cleat adapter 22 out of the clipless structure during use.

A presently preferred embodiment of the present invention and many of its improvements have been described with a degree of particularity. It should be understood that this description has been made by way of example, and that the invention is defined by the scope of the following claims.

We claim:

1. A pedal comprising:
   a main body including a first side, the first side of the main body defining a first clipless retaining structure;
   a cleat adapter including a base member, said base member receivable in said first clipless retaining structure; and
   a locking mechanism to lock said cleat adapter to said base member, said locking mechanism including a pin extending from said base member and a recess formed on said main body for receiving said pin.

2. A pedal as defined in claim 1, wherein:
   a member is attached on the top surface of said base member and is movable between a locked and unlocked position;
   said pin is attached to said member and extends from said base member when in said locked position and retracts into said base member in said unlocked position.

3. A pedal as defined in claim 2, wherein:

said member is pivotally attached to said base member, and is pivotable to move between said locked and unlocked positions.

4. A pedal as defined in claim 2, wherein:

said member has a front portion and a rear portion; and said pin is attached to said front portion.

5. A pedal as defined in claim 4, wherein:

said pin extends at a fixed acute angle to said member.

6. A pedal as defined in claim 5, wherein:

said pin has a rectangular cross section.

7. A pedal as defined in claim 5, wherein:

said recess has a rectangular cross section.

8. A pedal as defined in claim 2, wherein:

said pin has a lateral dimension; and said recess has a lateral dimension sized to closely fit said pin.

9. A pedal as defined in claim 1, wherein said recess is open on one end.

* * * * *